United States Patent [19]
Brosnan et al.

[11] Patent Number: 5,610,705
[45] Date of Patent: Mar. 11, 1997

[54] DOPPLER VELOCIMETER

[75] Inventors: Stephen J. Brosnan, San Pedro; Hiroshi Komine, Torrance, both of Calif.

[73] Assignee: Northrop Grumman Corporation, Los Angeles, Calif.

[21] Appl. No.: 389,667

[22] Filed: Feb. 16, 1995

[51] Int. Cl.$^6$ .................................................. G01P 3/36
[52] U.S. Cl. ........................................ 356/28.5; 356/5.09
[58] Field of Search ................................ 356/28.5, 5.15, 356/5.09

[56] References Cited

U.S. PATENT DOCUMENTS

| | | | |
|---|---|---|---|
| 4,195,311 | 3/1980 | Moran . | |
| 4,515,472 | 5/1985 | Welch . | |
| 4,707,698 | 11/1987 | Constant . | |
| 4,715,707 | 12/1987 | Reynolds, III et al. | 356/28.5 |
| 4,822,164 | 4/1989 | Breen | 356/28.5 |
| 4,919,536 | 4/1990 | Komine | 356/28.5 |
| 5,110,207 | 5/1992 | Harris | 356/4.5 |
| 5,123,730 | 6/1992 | Holmes et al. | 356/28.5 |
| 5,150,170 | 9/1992 | Morris | 356/28.5 |
| 5,164,948 | 11/1992 | Nettleton et al. | 372/32 |
| 5,187,538 | 2/1993 | Iwamoto et al. | 356/28.5 |
| 5,192,979 | 3/1993 | Grage et al. | 356/28.5 |
| 5,216,477 | 6/1993 | Korb | 356/28.5 |
| 5,229,830 | 7/1993 | Ishida et al. | 356/28.5 |
| 5,233,403 | 8/1993 | Mermelstein | 356/28.5 |
| 5,353,109 | 10/1994 | Langdon et al. | 356/28.5 |
| 5,485,009 | 1/1996 | Meyzonnetie et al. | 356/5.09 |

*Primary Examiner*—Stephen C. Buczinski
*Attorney, Agent, or Firm*—Terry J. Anderson; Karl J. Hoch, Jr.

[57] ABSTRACT

A heterodyne velocimeter system includes an illumination laser that illuminates a moving object with a coherent, laser beam. The laser illumination is reflected from the object as separate wavefronts (referred to as the signal light) and is passed through a range-focus lens pair, a polarizer element and through a partially reflective, partially transmissive element onto a plurality of separate light sensitive elements of a sensor which are referred to as pixels. A second source of laser illumination, such as a second laser provides a reference light beam that is directed onto a local oscillator scatter mask. The light beam from the second laser is scattered into separate wavefronts by the scatter mask and they are focussed by a lens onto the partially reflective partially transmissive element which reflects them onto the separate pixels of the sensor where they are individually mixed with the separate signal light wavefronts from the object. Thus light reflected from the other points of the moving object are similarly directed as signal light onto the pixels of the sensor and mixed with corresponding reference light wavefronts from the scatter mask to provide a two-dimensional array of emission points from local oscillator scatter mask is imaged onto the sensor to serve as the local oscillator for the reflected wavefronts at each pixel.

11 Claims, 2 Drawing Sheets

DOPPLER VELOCIMETER

BACKGROUND OF THE INVENTION

1. Field of the Invention

The present invention relates to laser Doppler velocimeter apparatus for measuring velocity information, and more particularly to a laser Doppler velocimeter incorporating heterodyne detection for image sensing.

2. Description of Background Art

The present invention is related both Doppler Global Velocimetry and also to heterodyne detection.

Doppler Global Velocimetry (DGV) is a technique described in U.S. Pat. No. 4,919,536 issued Apr. 24, 1990 to Komine that views a laser-illuminated scene with a camera-pair system that derives two-dimensional instantaneous velocity information from images of the Doppler scattered light. The narrow-band laser is tuned to one side of an absorption line of a medium like molecular iodine. One camera of the pair views the scene through a filter cell containing the absorption medium and therefore records an image onto which velocity information has been impressed. A second reference camera image is needed to remove the original intensity dependent scene information by image division. The normalized image intensity provides a measure of the Doppler shift at each pixel. Alignment of the two cameras' sensors is therefore required within subpixel accuracy.

Heterodyne detection functions by coherently mixing a local oscillator (LO) wave with signal light at the sensor surface. The LO wavefront must match the signal wavefront closely enough so that there is only one interference fringe across the sensor area. The spectral content of the detected signal is the difference frequency between the LO and illumination laser sources plus the Doppler frequency shift of the scattered signal light. A prime advantage of the technique is that the detection sensitivity is quantum limited if the LO power dominates all sources of noise.

Velocity measuring systems incorporating lasers, and heterodyne laser sensors with local oscillators are known in the art. References include the following patents.

U.S. Pat. No. 4,822,164 issued Apr. 18, 1989 to Breen entitled OPTICAL INSPECTION DEVICE AND METHOD discloses a closed optical gauge that directs a laser beam toward an object whose radial velocity, instantaneous position, and/or shape are to be measured, and utilizes the Doppler frequency shift of the reflected beam to make measurements. A reference sample of the original direct beam has its frequency shifted by an acoustooptical modulator. A closed loop system is created by sensing the difference in frequency between the reflected beam and the shifted reference beam. The amount of frequency modulation is then controlled so that the frequency of the shifted reference beam continuously tracks that of the reflected beam, preferably with a fixed offset of frequency. The output can be integrated with respect to time to obtain position or shape information.

Absolute distance to the object is measured by transmitting a train of pulses of light toward the object and receiving reflected light pulses back. The round trip time of the light pulses is ascertained by measuring the phase displacement of the envelope of the reflected signals relative to the envelope of the transmitted light signals, with the aid of a phase locked loop. The oscillator of the phase locked loop is locked to the envelope of a reference sample of the transmitted signal, and can operate selectively at the fundamental frequency or a higher harmonic frequency of that envelope. A selected harmonic from the oscillator can be compared as to phase with the corresponding harmonic of the reflected light pulses. With calibration, the system can measure flight time, and therefore distance to the object, with high resolving power at the higher harmonic frequencies.

U.S. Pat. No. 5,110,207 issued May 5, 1992 to Harris entitled OPTICAL SYSTEM INCLUDING INTERFEROMETER FOR ENHANCING THE PERFORMANCE OF A PHOTOCONDUCTIVE NON-SHOT NOISE LIMITED DETECTOR describes an interferometer for transmitting a beam of electro-magnetic energy toward a target, portions of the transmitted beam reflected by the target being directed onto a detecting surface of a detector element with a local oscillator beam to provide a beat frequency signal representative of, for example, target range. The interferometer comprises a first lens for focusing the target-reflected return beam onto substantially a point on a detecting surface. The interferometer additionally comprises a second lens, for example, for focusing the local oscillator beam through a focal point onto the first lens. The first and second lenses are disposed to align such focal point of the second lens with a focal point of the first lens to thereby direct the local oscillator beam onto the detecting surface of the detector element with a substantially uniform intensity distribution thereon. With such arrangement, the detector element may be implemented as a photoconductive, rather than a photovoltaic, detector with only a minimal net increase in the noise equivalent power (NEP) thereof, such as 5 dB, resulting in similar slight reduction in the signal-to-noise ratio of the interferometer. Since such photoconductive detector element may be cooled by thermoelectric stacks, the requirement for liquid nitrogen coolant is eliminated, thereby significantly reducing the size and weight of the interferometer system.

U.S. Pat. No. 5,123,730 issued Jun. 23, 1992 to Holmes et al. entitled APPARATUS FOR OPTICAL REMOTE WIND SENSING discloses apparatus that includes a light source for producing a coherent beam of light. A beam splitter is provided for splitting the beam of light into a first, transmitted beam segment and a second, local oscillator beam. A mechanism is provided for frequency shifting the frequency of one or both beam segments and for directing the first beam segment to a target. A remote target for scattering the first beam is provided. A mechanism is provided for combining the scattered first beam segment returning from the target and the second beam segment into a combined beam, and detecting the combined beam. A detector is operative to generate a signal indicative of the cross-wind along the path of the directed first beam segment. A mechanism for determining the wind speed normal to the path from the generated signal is also provided.

U.S. Pat. No. 5,150,170 issued Sep. 22, 1992 to Morris entitled OPTICAL PHASE CONJUGATE VELOCIMETER AND TRACKER discloses an apparatus and method for determining velocity and range of a target within a field of view. A velocimeter and tracker includes a laser that produces modulated coherent light, a portion of which illuminates targets coming into a field of view of the velocimeter and tracker. Coherent light reflected from the target travels back along a detection path toward a phase conjugate mirror as a probe wave. A higher intensity portion of the coherent light produced by the laser is split into equal parts that are directed toward the phase conjugate mirror from opposite directions and interact with the probe wave to produce a phase conjugate light signal that travels back along the detection path and is also reflected from the target. Light reflected by the target experiences a Doppler phase shift as a function of target velocity. First, second, and higher order phase shifted signals reflected from the target are imaged on photo diodes, producing an electrical signal having components corresponding to the frequency differences of the various order light signals. As a function of the sums and differences of the frequency components of the electrical signal, the range and velocity of the target are determined.

U.S. Pat. No. 5,164,948 issued Nov. 17, 1992 to Nettleton et al. entitled STABILIZED LOCAL OSCILLATOR FREQUENCY FOR HETERODYNE LASER SENSORS discloses a stabilized local oscillator frequency for heterodyne laser sensors comprised of an acousto-optic crystal which provides a constant frequency offset $f_1$, to a portion of laser transmitter power at frequency $f_0$, for injection locking a separate local oscillator connected to a detector which simultaneously mixes $f_1$ with the return signal $f_0$ from a target. The detector outputs the difference frequency between $f_0-f_1$ which is processed for the desired information. Proper local oscillator tuning is maintained through the use of a piezo-electric translator regulating the axial length of the local oscillator.

U.S. Pat. No. 5,187,538 issued Feb. 16, 1993 to Iwamoto et al. entitled LASER DOPPLER VELOCIMETER describes a laser Doppler velocimeter which has an optical system using a semiconductor laser as a light source for receiving a scattered light by reflection from natural particulate in fluid to be measured passing interference fringes formed in a region to be measured by a semiconductor optical detector, and a signal processor having a converter for converting a Doppler signal from the semiconductor optical detector to a predetermined waveform (e.g., a square wave) according to at least two different threshold values, and an arithmetic unit for comparing the processed signals from each other to judge that the scattered signal is from one natural particulate or not (i.e., the propriety of its measuring accuracy) and to calculate the velocity of the fluid to be measured according to the judged result and the process result of the converter from the period of the square wave when judging "a normal measurement".

U.S. Pat. No. 5,192,979 issued Mar. 9, 1993 to Grage et al. entitled METHOD AND APPARATUS FOR RECOGNIZING AND IDENTIFYING TARGETS teaches a method and apparatus that detects and identifies targets using a laser and operating in accordance with Doppler radar techniques. A laser sensor comprises a laser transmitter and an optical superheterodyne receiver and detects characteristic surface vibrations of targets and derives, from the laser echo signals, after frequency conversion and demodulation, low frequency oscillations having the frequencies of the vibration spectrum, from which, through comparison with patterns of known targets, provides detection and identification of the target.

U.S. Pat. No. 5,216,477 issued Jun. 1, 1993 to Korb entitled EDGE TECHNIQUE FOR MEASUREMENT OF LASER FREQUENCY SHIFTS INCLUDING THE DOPPLER SHIFT discloses a method for determining the frequency shift in a laser system by transmitting an outgoing laser beam, receiving an incoming laser beam having a frequency shift, acquiring a first signal by transmitting a portion of the incoming laser beam to an energy monitor detector and a second signal by transmitting a portion of the incoming laser beam through an "edge" filter to an edge detector, deriving a first normalized signal which is proportional to the transmission of the "edge" filter at the frequency of the incoming laser beam, deriving a second normalized signal which is proportional to the transmission of the "edge" filter at the frequency of the outgoing laser beam, and determining the frequency shift by processing the first and second normalized signals.

U.S. Pat. No. 5,229,830 issued Jul. 20, 1993 to Ishida et al. entitled DOPPLER VELOCIMETER describes an apparatus for detecting the speed information of an object that comprises a light source device, a frequency shifting device for shifting the frequency of a light flux from the light source device, a light-flux dividing device for dividing a light-flux whose frequency is divided by the frequency shifting device, one of the divided light fluxes divided by the light-flux whose frequency is divided by the frequency shifting device, one of the divided light fluxes divided by the light-flux dividing device being projected onto an object to be measured and the other light flux being projected in a direction other than that of the one of the light fluxes, a first detection device for detecting light from the object to be measured to which the one of the light fluxes is projected, the light detected by the first detection having undergone a Doppler shift proportional to the speed of the object to be measured, a second detection device for detecting the other light flux, and a speed information detection device for detecting the speed information of the object to be measured on the basis of the comparison between the detection results of the first and second detection devices.

U.S. Pat. No. 5,233,403 issued Aug. 3, 1993 to Mermelstein entitled HETERODYNE ARRAY FOR MEASUREMENT OF TARGET VELOCITY teaches a system for determining the angular velocity of a mobile target relative to a station. The system develops first and second reference beams and a beam to the target to enable the target to generate first and second signals. Optical devices, preferably fiberoptical devices, responsive to the first and second reference beams and to the first and second signals respectively received from the target at discrete first and second positions on the station, respectively produce first and second interference pattern signals. Each of said received signals has a Doppler shift as a function of the movement of the target. An electrical processing circuit then processes the interference pattern signals to develop a signal indicative of the target's angular velocity.

SUMMARY OF THE INVENTION

The present invention applies heterodyne detection to an imaging sensor by a technique for providing the proper local oscillator (LO) wavefront matching for each pixel of the sensor. The technique provides a two-dimensional array of LO emission points that is imaged onto the sensor to serve as the LO for each pixel. Since the radius of curvature of the LO wave is designed to match the spherical curvature of the signal light imaged from a scattering point in the laser-illuminated object plane, the mixing for each pixel is coherent and all advantages of heterodyne detection apply.

An object of the present invention is to a two-dimensional image sensor for a laser illuminated object.

Another object of the present invention is to provide a two-dimensional image sensor wherein a two-dimensional array of local oscillator emission points are imaged onto the sensor to function as the local oscillator for each pixel of the sensor.

BRIEF DESCRIPTION OF THE DRAWINGS

The above set forth and other features of the invention are made more apparent in the ensuing Detailed Description of the Invention when read in conjunction with the attached drawings, wherein.

DESCRIPTION OF A PREFERRED EMBODIMENT

Figure 1:
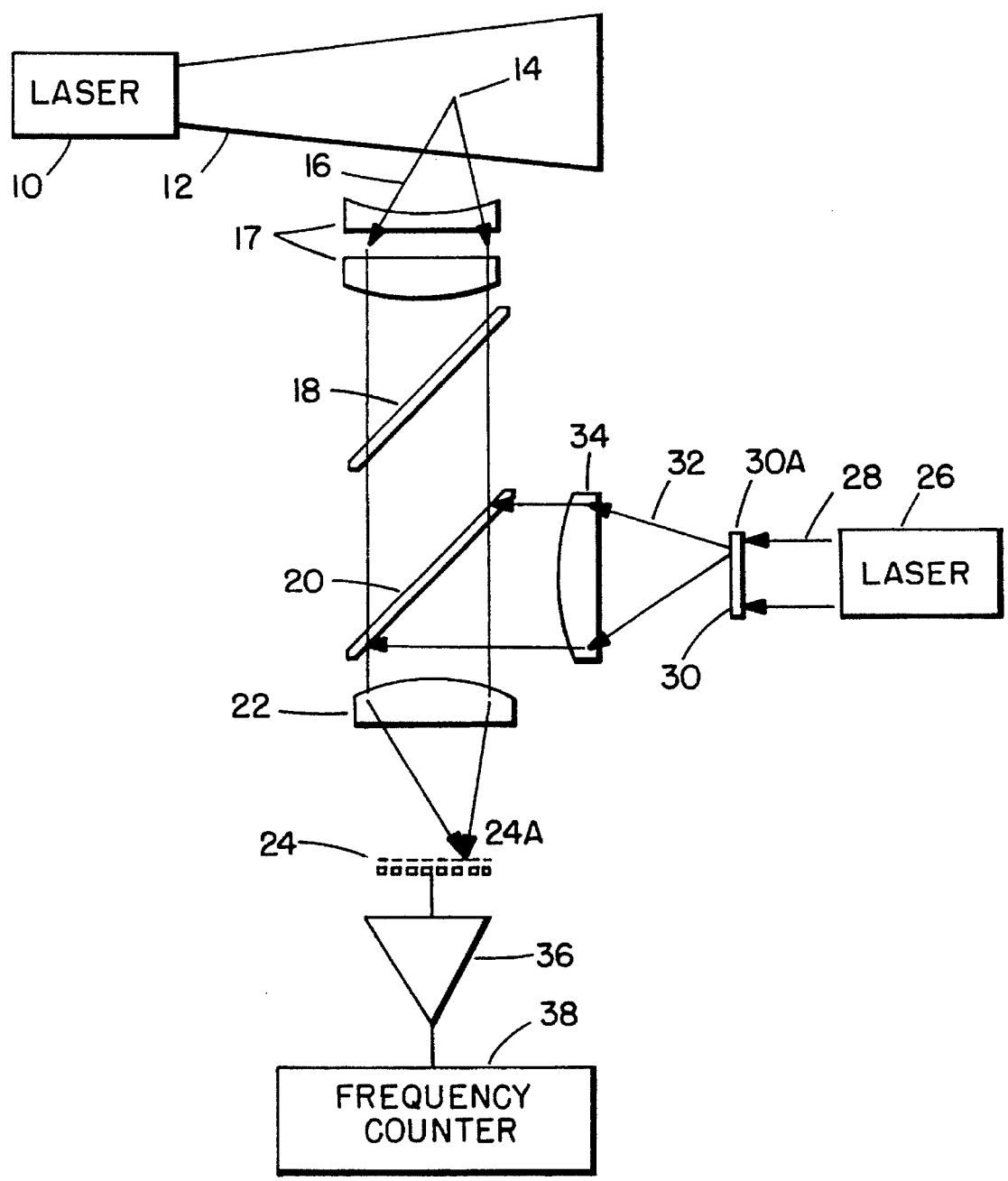
FIG. 1 is a schematic block diagram of a heterodyne velocimeter employing separate lasers for illumination of an object and for a local oscillator.

Referring to FIG. 1, one embodiment of a heterodyne velocimeter system according to the present invention is shown including an illumination laser 10 that illuminates a moving object with a coherent, laser beam 12. Only one point 14 of a moving object is illustrated in FIG. 1 for purposes of explanation.

Illumination 16 reflected from point 14 and referred to as the signal light is passed through range-focus lens pair 17 and polarizer element 18 and partially reflective, partially transmissive element 20 and onto a plurality of separate light sensitive elements of sensor 24 which are referred to hereinafter as pixels. A second source of laser illumination, which in the embodiment of FIG. 1 is a second laser 26 provides a reference light beam 28 that is directed onto a local oscillator scatter mask 30. Points of light from laser 26 are scattered by the scatter mask 30. For purposes of explanation, only the light from one point 30A on the scatter mask 30 is shown as light ray 32 in FIG. 1. The reference light ray 32 is collimated by lens 34 onto element 20 which reflects it onto the pixel 24A of sensor 24 where it is mixed with the signal light ray from point 14. Light reflected from the other points of the moving object are likewise directed as signal light onto other pixels of sensor 24 and mixed with corresponding reference light rays from mask 30. Thus, a two-dimensional array of emission points from local oscillator scatter mask 30 is imaged onto sensor 24 to serve as the local oscillator for each pixel. The reflected radiation wavefront at each pixel of sensor 24 is at a first wave frequency and the reference radiation wavefront at each pixel is at a second frequency. The resulting mixed wave at each pixel has an intensity that oscillates in time from bright to dark to bright etc. at the difference frequency between the first and second wave frequencies.

In FIG. 1 range-focus lens assembly 17 creates a region between lenses 17 in which signal rays from the test point are collimated and are parallel to rays originating from a corresponding local oscillator point of mask 30. Each test point in the object plane illuminated by laser 10 (and its corresponding local oscillator point from mask 30 provides a collimated ray bundle travelling at a unique angle in the intralens region between lenses 17 and 34. Lens 34 and lens 22 are focused at infinity, so these differing unique angles focus at different points in the focal plane. Adjustment of range-focus lens pair 17 allows imaging at other distances.

The illumination laser 10 and the local oscillator laser 26, because their light rays are mixed coherently, must be narrow band and uniphase during the measurement time period. Their frequencies must be locked together with a fixed offset.

Figure 2:
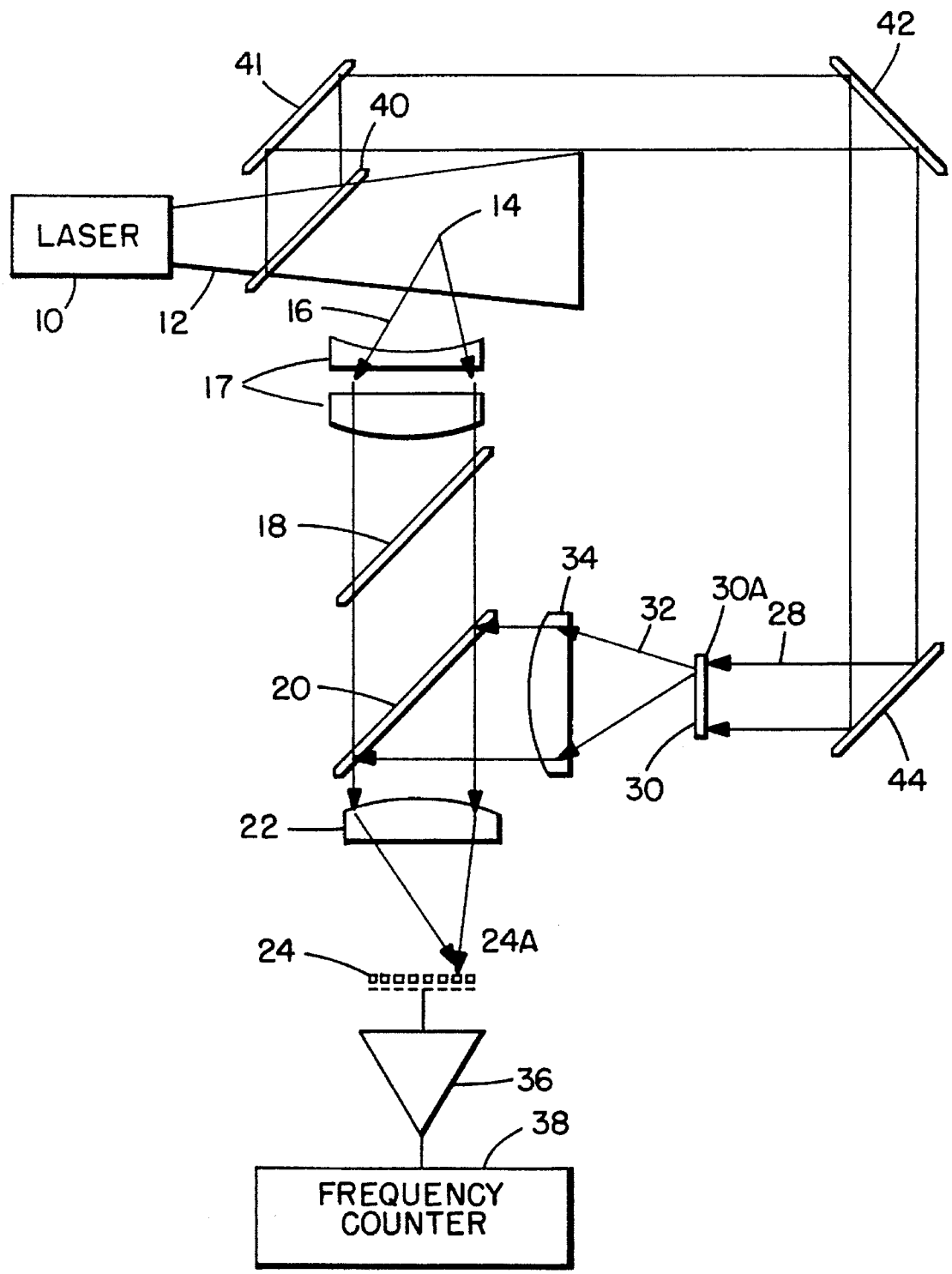
FIG. 2 is a schematic block diagram of a homodyne velocimeter that employs a single laser for both object illumination and local oscillation.

In the case of homodyne operation wherein only positive or only negative velocity is sensed, the offset is zero therefore the local oscillator beam may be obtained by beam splitting from the illumination laser. Referring to FIG. 2, a homodyne embodiment is shown that is similar to the embodiment of FIG. 1 except that laser 26 of FIG. 1 has been eliminated and replaced by beam splitter element 40 and reflectors 41, 42 and 44. In FIG. 2, beam splitter element 40 is placed in the path of illumination beam 12 and is then reflected from reflector 41 and a pair of reflectors 42 and 44 onto scatter mask 30 as the local oscillator beam. The operation of the embodiment of FIG. 2 is the same as described for the embodiment of FIG. 1.

For applications in which an image sensor views both positive and negative velocities, the simpler homodyne sensor configuration is not suitable since it cannot discriminate the sign of the velocity. Heterodyne detection must be employed using illumination and LO laser sources of slightly different frequencies. A separate single-element heterodyne detector would provide both a closed-loop relative-frequency control sensor and also a known zero-velocity reference point to the velocity calculation module. The lasers must be frequency stable to within approximately $\delta v/\lambda$, where $\delta v$ is the desired velocity resolution and $\lambda$ is the laser wavelength. For example, to obtain 10 cm/s velocity resolution the 1 µm laser sources must be relatively stable to 100 kHz. Current commercial monolithic laser-diode-pumped Nd:YAG lasers meet this specification.

Eye safety, an important practical factor, is strongly dependent on the laser wavelength. A wavelength change from 1 µm to 1.5 µm brings an increase in the maximum permissible exposure of $2\times10^4$. The feasibility of this new velocimetry technique is insensitive to the wavelength used, contrasting with DGV for which a laser must be matched to a filter medium.

There are several possibilities for the implementation of the local oscillator point array illuminator shown in FIG. 1 as mask 30. One implementation is the use of scatterers imbedded in a non-transmissive plate. Another possibility is the use of single-mode fibers of high numerical aperture carrying local oscillator illumination. A still further implementation is the use of a lenslet array providing an array of focused spots in the focal plane of the local oscillator lens.

The light rays of the velocity-dependent scene and of the LO are combined at the image sensor 24, which differs from conventional video or CCD devices in that fast time-dependent signals must be retrievable from each pixel. These rays have in general different frequencies which mix in the square-law detector contained in the sensor pixel, thereby yielding a waveform that oscillates at the difference of the two frequencies. The measured velocity is related to the product of the difference frequency and the laser wavelength. The signal emitted from the sensor pixel is then fed to the measurement electronics.

The measurement electronics would possibly consist of (1) a limiting amplifier followed by a frequency counter having a digital computer-readable result, or (2) temporal-capture electronics with subsequent Fourier analysis. For both of these schemes the sensor signal from a window of time is analyzed. The width of the window is inversely proportional to the velocity resolution.

The choice of laser wavelength has an impact on the required measurement electronics bandwidth. Since the Doppler frequency shift is proportional to $v/\lambda$, longer wavelengths tend both to decrease the necessary electronics bandwidth and also to widen the needed temporal window. Applications in the sonic range might then operate at longer wavelengths in order to stay within the speed capabilities of transient digitizers.

In both the embodiments of FIG. 1 and FIG. 2, measurement electronics comprising limiting amplifier 36 followed by frequency counter 38 are connected to the sensor 24 to provide a digital computer readable result.

An alternative scheme would be the use of temporal-capture electronics with subsequent Fourier analysis in a data processor. For both measurement electronic techniques the sensor signal from a window of time is analyzed. The width of the window is inversely proportional to the velocity resolution.

There are also a number of application-dependent configurations for sensor readout. Where simultaneous velocity acquisition from all pixels is required, a parallel array of readout electronics is needed for each pixel. Where sequential readout is adequate, a bank of analog switches would select a pixel to route to the measurement electronics. Freely addressable pixels would be a generally useful feature for (1) area-of-interest (AOI) processing of selected image window, which could be movable to track an image feature, and (2) random-access sampling of pixels, allowing the search for broad features which then could be narrowed to an AOI of interest.

While the invention has been particularly shown and described with respect to a preferred embodiment thereof, it will be understood by those skilled in the art that changes in form and details may be made therein without departing from the scope and spirit of the invention.

What is claimed is:

1. A two-dimensional image sensing velocimeter system for determining the velocity of an object comprising:

a source of coherent illumination beam of radiation directed onto a moving object wherein said moving object reflects said beam of radiation in the form of a plurality of separate unique simultaneously occurring reflected radiation wavefronts, means for directing said plurality of simultaneously occurring separate reflected radiation wavefronts onto a radiation sensitive detection means having a plurality of separate radiation sensitive detection elements disposed in a two-dimensional array, each of said plurality of said radiation sensitive detection elements being responsive to a separate unique one of said simultaneously occurring reflected radiation wavefront directed thereon, a local oscillator source of a plurality of simultaneously occurring separate reference radiation wavefronts, said local oscillator source of wavefronts including a scatter mask for scattering radiation into said plurality of simultaneously occurring separate reference radiation wavefronts, means for directing said plurality of simultaneously occurring separate reference radiation wavefronts onto separate ones of said plurality of radiation sensitive detection elements of said radiation sensitive detection means wherein each of said separate reference radiation wavefronts thereon are mixed coherently with a separate unique reflected radiation matching wavefront to produce a mixed wave that oscillates in time and wherein each of said separate ones of said plurality of radiation sensitive detection means simultaneously generates an electrical output signal representative of said oscillating mixed wave produced by each of said separate unique reflected radiation wavefronts mixed with each of said separate reference radiation wavefronts.

2. A two dimensional image sensing velocimeter system according to claim 1 wherein said separate unique reflected radiation wavefront at each said detection element is at a first wave frequency, wherein said separate reference radiation wavefront at each said detection element is at a second wave frequency, and wherein said mixed wave at each said detection element oscillates in time at the difference frequency between said first and second wave frequencies.

3. A two-dimensional image sensing velocimeter system according to claim 2 wherein said object moves in time within said illumination beam of radiation to continually reflect sequential pluralities of wavefronts of said illumination radiation beam for separate spatial positions as said object moves in time with respect to said illumination radiation beam, and wherein said continually reflected wavefronts of illumination are sequentially directed onto said radiation sensitive detection means.

4. A two-dimensional image sensing velocimeter system according to claim 3 further including electronic means for measuring said electrical output signals from said electrical output detection means for determining the velocity of said moving object as a function of said difference frequency oscillation of said mixed wave.

5. A two-dimensional image sensing velocimeter system recording to claim 1 wherein said source of coherent illumination beam is a laser.

6. A two-dimensional image sensing velocimeter system according to claim 5 wherein said local oscillator source of a plurality of separate reference radiation wavefronts includes a second laser for producing a coherent reference beam of radiation and an optical scatter mask disposed in the path of said reference beam for scattering said reference beam into said plurality of simultaneously occurring separate reference radiation wavefronts.

7. A two-dimensional image sensing velocimeter system according to claim 6 further including a partially transmissive, partially reflective optical element, wherein said means for directing said plurality of separate reflected radiation wavefronts includes an optical lens system for directing said reflected radiation wavefronts through said partially transmissive, partially reflective optical element and onto said radiation sensitive detection means, and wherein said means for directing said plurality of separate reference radiation wavefronts includes an optical lens system for directing said reference radiation wavefronts onto said partially transmissive, partially reflective optical element where said reference radiation wavefronts are reflected onto said radiation sensitive detection means.

8. A two-dimensional image sensing velocimeter system according to claim 5 wherein said local oscillator source of a plurality of separate reference radiation wavefronts includes a beam splitter means disposed between said laser and said object and in the path of said coherent illumination beam for providing a reference beam of coherent illumination, and wherein said local oscillator source of a plurality of separate reference radiation wavefronts includes an optical scatter mask disposed in the path of said reference beam of coherent illumination for scattering said reference beam into said plurality of separate reference radiation wavefronts.

9. A two-dimensional image sensing velocimeter system according to claim 4, wherein said source of coherent illumination is a laser that generates a beam of coherent radiation at a given wavelength, and wherein said electronic measuring means determines the velocity of said moving object as a function of the product of said difference frequency and said given laser wavelength.

10. A two-dimensional image sensing velocimeter system according to claim 1 wherein said scatter mask is composed of single mode light fibers of high numerical aperture.

11. A two-dimensional image sensing velocimeter system according to claim 1 wherein said scatter mask is composed of a lenslet array.

* * * * *